(12) United States Patent
Mackenzie et al.

(10) Patent No.: US 10,673,042 B2
(45) Date of Patent: Jun. 2, 2020

(54) PROTECTIVE FILMS FOR PRINTED ELECTROCHEMICAL CELLS AND METHODS OF PACKAGING ELECTROCHEMICAL CELLS

(71) Applicant: Imprint Energy, Inc., Alameda, CA (US)

(72) Inventors: John Devin Mackenzie, Seattle, WA (US); Qiang Zheng, Alameda, CA (US); Jesse Smithyman, Alameda, CA (US); Christine Ho, Alameda, CA (US)

(73) Assignee: Imprint Energy, Inc., Alameda, CA (US)

( * ) Notice: Subject to any disclaimer, the term of this patent is extended or adjusted under 35 U.S.C. 154(b) by 241 days.

(21) Appl. No.: 15/949,912

(22) Filed: Apr. 10, 2018

(65) Prior Publication Data

US 2018/0294454 A1    Oct. 11, 2018

Related U.S. Application Data

(60) Provisional application No. 62/483,887, filed on Apr. 10, 2017.

(51) Int. Cl.
| | |
|---|---|
| *H01M 2/12* | (2006.01) |
| *H01M 10/52* | (2006.01) |
| *H01M 2/02* | (2006.01) |
| *H01M 6/40* | (2006.01) |
| *H01M 10/04* | (2006.01) |

(52) U.S. Cl.
CPC ....... *H01M 2/1264* (2013.01); *H01M 2/0257* (2013.01); *H01M 6/40* (2013.01); *H01M 10/0436* (2013.01); *H01M 10/52* (2013.01); *H01M 10/523* (2013.01); *H01M 2300/0045* (2013.01)

(58) Field of Classification Search
CPC ..... H01M 2/1264; H01M 2/0257; H01M 6/40
See application file for complete search history.

(56) References Cited

U.S. PATENT DOCUMENTS

| | | | |
|---|---|---|---|
| 6,379,835 B1 | 4/2002 | Kucherovsky et al. | |
| 8,679,674 B2 * | 3/2014 | Liang | H01M 2/0202 429/135 |
| 2005/0260492 A1 | 11/2005 | Tucholski et al. | |
| 2011/0076550 A1 * | 3/2011 | Liang | H01M 2/0202 429/175 |
| 2012/0214047 A1 | 8/2012 | Kwak et al. | |

(Continued)

FOREIGN PATENT DOCUMENTS

| | | | | |
|---|---|---|---|---|
| JP | 2014192128 A | * | 10/2014 | |
| JP | 2016006022 A | * | 1/2016 | |
| WO | WO-02059990 A2 | * | 8/2002 | ............. H01M 2/12 |

OTHER PUBLICATIONS

Machine translation of JP 2014-192128 (no date).*

(Continued)

*Primary Examiner* — Amanda C. Walke
(74) *Attorney, Agent, or Firm* — Kwan & Olynick LLP

(57) ABSTRACT

Electrochemical cells with a protective film that is permeable to hydrogen, or that include a catalyst that facilitates formation of mobile hydrogen species, that promotes sequestration or gettering of hydrogen or oxygen, and/or that facilitates conversion of hydrogen or oxygen to $H_2O$, are disclosed.

20 Claims, 10 Drawing Sheets

(56) References Cited

U.S. PATENT DOCUMENTS

2013/0273443 A1 10/2013 Zhang et al.
2019/0288248 A1* 9/2019 Liu ..................... H01M 2/029

OTHER PUBLICATIONS

International Search Report and Written Opinion; PCT International Searching Authority/US dated Jun. 25, 2018; International Application No. PCT/US2018/026960; 14 pages, International Searching Authority/United States; Commissioner for Patents; Alexandria, Virginia.
International Preliminary Report on Patentability dated Oct. 24, 2019; PCT International Application No. PCT/US2018/026960; 7 pages; The International Bureau of WIPO, Geneva, Switzerland.

* cited by examiner

FIG. 1

| Permeability | | | |
|---|---|---|---|
| Gas | $mL/m^2 \cdot 24\ h \cdot MPa$ | $cc/(100\ in^2 \cdot 24\ h \cdot atm)$ 23°C (73°F), 50% RH | ASTM D-1434-82 (1988)*1 |
| Carbon Dioxide | 6840 | 45 | |
| Oxygen | 3800 | 25 | |
| Hydrogen | 38,000 | 250 | |
| Nitrogen | 910 | 6 | |
| Helium | 63,080 | 415 | |
| Vapor | $g/(m^2 \cdot 24\ h)$ | $g/(100\ in^2 \cdot 24\ h)$ | |
| Water | 54 | 3.5 | ASTM E-96-92 |

FIG. 2

| | |
|---|---|
| WVTR ($g/m^2/day$) | 143 |
| OTR ($cm^3/m^2/day$) | 97 |

Figure 2. Gas Permeability of Mylar® vs. Temperature

FIG. 4

| Barrier Film | Polymers | OTR | MVTR | Capacity (Primary Cell) | Capacity influenced by environment? | H₂ escape Ability? | Potent cell bulging if gassing? |
|---|---|---|---|---|---|---|---|
| Low barrier film | PI | 20 | 3 | Bench mark | Yes | Yes | No |
| High moisture barrier film | Metallized OPP | 10 | 0.04 | Similar* | No | Yes | No |
| High barrier film | Ceramic coated PET | 0.6 | 0.04 | Similar* | No | No | Yes |
| Low barrier film | PET or PP | 1-20 (or wider) | 0.5-3 or higher | Similar/ higher | Yes | Yes | No |

*with trapped moisture

FIG. 5

|  | Monomers | Tm | Water Absorption |
|---|---|---|---|
| PA 66 | hexene diamine, adipic acid | 260 °C | 8.5% |
| PA 612 | hexene diamine, dodecanoic acid | 215 °C | 2.8% |
| PA 6 | caprolactam (aminocaproic acid) | 220 °C | 9.5% |
| PA 12 | laurinlactam | 178 °C | 1.5% |
| PA 6/66 (85:15) | hexene diamine, adipic acid caprolactam | 195 °C | 10.5% |
| PA 6I/6T | hexene diamine, isophthalic acid, terephthalic acid | $T_g$ = 132 °C | 1.3% |

FIG. 8

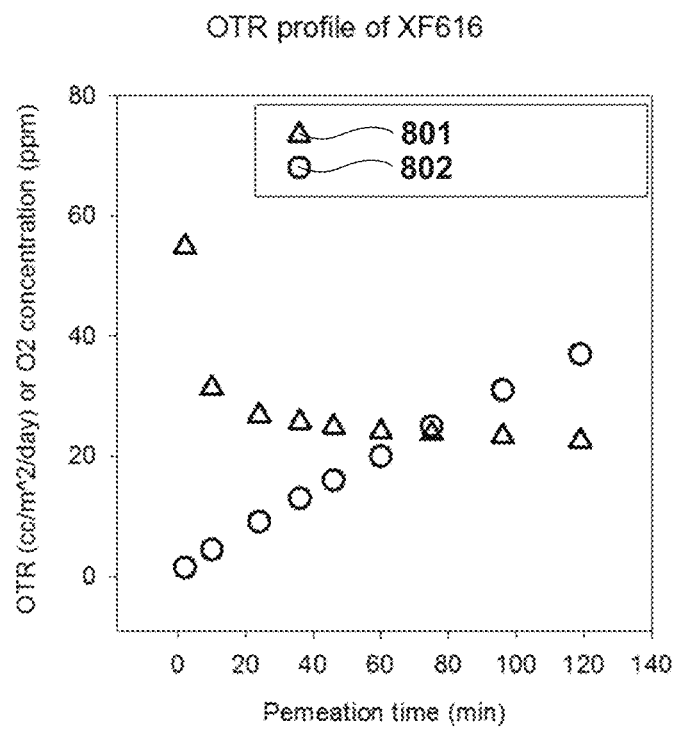

OTR profile of XF616

| Polymer | H₂ Permeability (Barrer)[b] | H₂/CO₂ selectivity |
| --- | --- | --- |
| Cellulose acetate | 2.63 | 0.4 |
| Ethyl cellulose | 87 | 3.3 |
| Eval film (co-polymer of polyethylene and polyvinyl alcohol) | 0.5 | 2.5 |
| Polybenzyl methacrylate | 11.0 | 1.4 |
| Polydimethyl siloxane (ref) | 375 | 0.3 |
| Polyetherimide | 7.8 | 5.9 |
| Polyethylene low density film | 17.3 | 0.9 |
| Polyimide (Matrimid) | 28.1 | 2.6 |
| Polymethyl methacrylate | 2.4 | 4 |
| Polymethylpentene | 125 | 1.5 |
| Polyphenyleneoxide | 113 | 1.5 |
| Polystyrene MW 280 K | 23.8 | 2.3 |
| Polystyrene-co-butadiene | 7.9 | 0.5 |
| Polysulfone | 12.1 | 2.0 |
| Polyvinyl acetate | 15.1 | 1.2 |
| Polyvinylidene fluoride (Kynar) | 2.4 | 2.0 |

PROTECTIVE FILMS FOR PRINTED ELECTROCHEMICAL CELLS AND METHODS OF PACKAGING ELECTROCHEMICAL CELLS

RELATED APPLICATION(S)

This application claims priority to U.S. Provisional Pat. Appl. No. 62/483,887, filed Apr. 10, 2017, incorporated herein by reference.

FIELD OF THE INVENTION

The present invention generally relates to the field of electrochemical cells and protective films therefor. More specifically, embodiments of the present invention pertain to electrochemical cells with a protective film that is permeable to hydrogen, a catalyst that facilitates formation of mobile hydrogen species or that promotes sequestration or gettering of hydrogen or oxygen, and/or a catalyst that facilitates conversion of hydrogen or oxygen to $H_2O$, and methods of making the same.

DISCUSSION OF THE BACKGROUND

Packaging batteries for a broad range of chemistries is an important part of battery technology and may impact battery safety, lifetime and performance. In the cases of highly reactive Li ion and Li polymer batteries having non-aqueous chemistries, the packaging is intended to effectively and completely seal off all gases and liquids from passing out of or into the cell. Ambient gases such as $O_2$, $H_2O$ vapor, $CO_2$ and $N_2$ can react with battery materials (e.g., Li), leading to detrimental side reactions, performance degradation and even dangerous gassing ($H_2$ generation). Leakage of battery materials, such as lithium salts and electrolyte solvent, out of the battery package can create a health and fire hazard. High barrier films based on metal and polymer laminates sealed with thermoplastic adhesives are typically used in "pouch cell" Li polymer batteries for mobile electronics, while metal can based packaging is often used for larger Li ion cells (e.g., 18650 cells).

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

In one aspect, the present invention relates to an electrochemical cell comprising a cathode, an anode, a current collector in contact with one of the cathode and the anode, an electrolyte in contact with the cathode and the anode, and a protective film directly on or around the electrochemical cell. The protective film is finitely permeable to $H_2$ gas and $O_2$ gas, configured to allow $H_2$ gas in the cell to exit from the cell, and has a permeation ratio of $H_2$ gas to $O_2$ gas greater than or equal to 10:1. In further embodiments, the electrochemical cell further comprises a second current collector in contact with the other of the cathode and the anode. Each of the first and second current collectors may independently comprise the same metal or metal alloy or different metals or metal alloys. The electrochemical cell may be a multivalent ion electrochemical cell.

Alternatively, the protective film comprises a first additive that promotes (i) forming monatomic or mobile hydrogen species or (ii) sequestering or gettering hydrogen or oxygen. In another alternative, the protective film comprises a first additive that promotes oxidation of hydrogen to $H_2O$ and/or reduction of oxygen to $H_2O$. The protective film may have a permeation ratio of $H_2$ gas to $O_2$ gas greater than or equal to 15:1, 100:1, or any other value >10:1.

The electrochemical cell may have an $H_2$ gas transmission rate near or at operating or storage conditions of the cell of greater than 10 $cc/m^2/day$, 20 $cc/m^2/day$, 200 $cc/m^2/day$, or any other value >10 $cc/m^2/day$. Alternatively or additionally, the electrochemical cell may have an $O_2$ gas transmission rate near or at operating or storage conditions of the cell of less than 20 $cc/m^2/day$, 10 $cc/m^2/day$, or any other value >20 $cc/m^2/day$.

The protective film may comprise a polyimide, a polyamide or a polyethylene terephthalate (PET), and in some embodiments, may further comprise a coating. The coating may comprise an inorganic component, a polymeric component or an organic component. The inorganic component may be or comprise a metal oxide. In some examples, the protective film comprises a zeolite additive. In these and other embodiments, the protective film may be a packaging layer.

The electrochemical cell may further comprise moisture. In some embodiments, the protective film may contain the moisture.

The electrolyte may comprise an ionic liquid and/or a metal salt (which may further contain moisture). In some embodiments, the electrolyte absorbs water entering the electrochemical cell after the electrochemical cell has been fabricated.

The electrochemical cell may further comprise a substrate, where the cathode, the anode, the electrolyte, and the first and second current collectors are sealed between the protective film and the substrate. In some embodiments, the substrate may comprise a metal foil in contact with one of the first and second current collectors. The metal foil may function as a contact for a corresponding one of the cathode and the anode. In other or further embodiments, the substrate may comprise an electrical insulator, such as a plastic. For example, the electrochemical cell may comprise a metal foil on the substrate, and the metal foil may be in contact with one of the first and second current collectors. In any of these embodiments, the metal foil may have a pattern. The pattern may include a first tab that functions as a contact for a corresponding one of the cathode and the anode. In such embodiments, the electrochemical cell may further comprise a second tab electrically connected to the other of the first and second current collectors not in contact with the metal foil, wherein the second tab functions as a contact for the other of the cathode and the anode.

In embodiments of the electrochemical cell in which the protective film comprises a first additive that promotes (i) forming monatomic or mobile hydrogen species or (ii) sequestering or gettering hydrogen or oxygen, the first additive may promote sequestering or gettering hydrogen or oxygen. In some examples, the first additive may comprise an oxidizable metal film or oxidizable metal particles. For example, the first additive may be or comprise a film or particle of a metal and/or a metal oxide in which hydrogen is soluble. When the first additive comprises a metal, the first additive may comprise Pd, Pt, Ta, or an oxide or alloy of Pd, Pt and/or Ta.

The protective film may have an oxygen permeation rate of less than 10 cc/m$^2$/day, 1 cc/m$^2$/day, or any other value <10 cc/m$^2$/day.

In some embodiments, the anode may comprise a second additive that promotes (i) forming monatomic or mobile hydrogen species or (ii) sequestering or gettering hydrogen or oxygen. The second additive may be the same as or different from the first additive.

In other or further embodiments, the electrolyte may comprise a third additive that promotes forming monatomic or mobile hydrogen species. The third additive may be the same as or different from the first additive and/or the second additive.

In other or even further embodiments, at least one of the current collectors may comprise a fourth additive that promotes forming monatomic or mobile hydrogen species or sequestering or gettering hydrogen or oxygen. The fourth additive may be the same as or different from the first, second and/or third additives.

In other or still further embodiments, the electrochemical cell may further comprise a non-electrically conductive layer that may include a fifth additive that promotes forming monatomic or mobile hydrogen species or sequestering or gettering hydrogen or oxygen. The fifth additive may be the same as or different from the first, second, third and/or fourth additives.

In yet other or further embodiments, at least one of the first and second current collectors may include a sixth additive that promotes forming monatomic or mobile hydrogen species or sequestering or gettering hydrogen or oxygen. The sixth additive may be the same as or different from the first, second, third, fourth and/or fifth additives.

In embodiments of the electrochemical cell that comprise a first additive that promotes oxidation of hydrogen to $H_2O$ or reduction of oxygen to $H_2O$, the first additive may be or may comprise a metal film or particle (e.g., as described herein). In such embodiments, the anode may comprise a second additive that promotes (i) oxidation of hydrogen to $H_2O$, (ii) reduction of oxygen to $H_2O$, or (iii) sequestering or gettering hydrogen or oxygen (e.g., that sequesters or getters hydrogen or oxygen). The second additive may be the same as or different from the first additive.

Alternatively or additionally, the first current collector or the second current collector may comprise a third additive that promotes oxidation of hydrogen to $H_2O$, reduction of oxygen to $H_2O$, or sequestering or gettering hydrogen or oxygen. The third additive may be the same as or different from the first and/or second additives.

The electrochemical cell may further comprise a non-electrically conductive layer that includes a fourth additive that promotes oxidation of hydrogen to $H_2O$, reduction of oxygen to $H_2O$, or sequestering or gettering hydrogen or oxygen. The fourth additive may be the same as or different from the first, second and/or third additives.

In some embodiments, the first additive may oxidize hydrogen at a rate greater than or equal to $9*10^{-4}$ moles of $H_2$ per m$^2$ of cell packaging area per day. In further embodiments, the rate may be greater than or equal to $9*10^{-3}$ moles of $H_2$ per m$^2$ of cell packaging area per day, or any other value >$9*10^{-4}$ moles of $H_2$ per m$^2$ of cell packaging area per day. Alternatively, the first additive may reduce oxygen at a rate greater than or equal to $4.5*10^{-4}$ moles of $O_2$ per m$^2$ of cell packaging area per day. In further embodiments, the rate may be greater than or equal to $4.5*10^{-3}$ moles $O_2$ per m$^2$ of cell packaging area per day, or any other value >$4.5*10^{-4}$ moles of $O_2$ per m$^2$ of cell packaging area per day.

BRIEF DESCRIPTION OF THE DRAWINGS

FIG. 1 is a table showing the transmission rates of various gases across a polyimide protective film.

FIG. 2 is a table showing the water vapor and oxygen transmission rates of a 100 micron-thick polyimide film.

FIG. 4 is a table showing various gas transmission rates and qualities of protective films made of various materials.

FIG. 5 is a table showing the melting point and water sequestration properties of various monomers.

FIG. 8 is a graph showing the oxygen transmission rate of XF616 polyimide over time.

FIG. 9 is a table showing hydrogen permeability and the ratio of hydrogen permeability to carbon dioxide permeability for various polymers.

DETAILED DESCRIPTION

Figure 3:
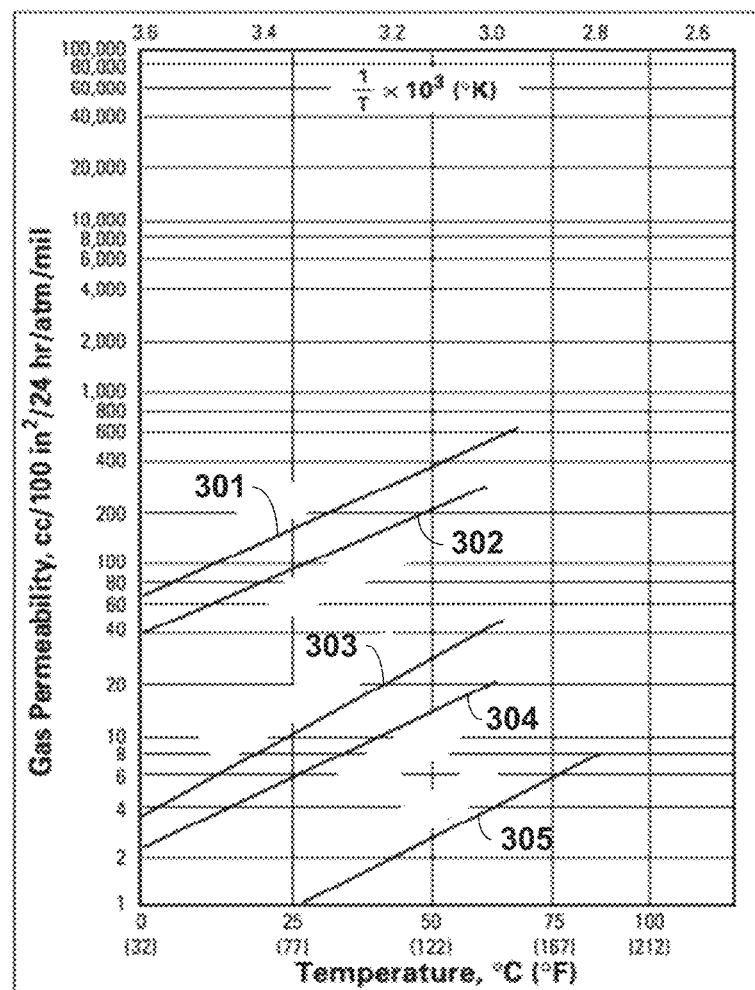
FIG. 3 is a graph showing the transmission rates of various gases across a Mylar® film.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

Batteries such as the multivalent zinc ion batteries described in U.S. Pat. Nos. 9,076,589, 9,276,292, and *Proceedings of the IEEE*, vol. 103, iss. 4, pgs. 535-553, have a higher tolerance for exposure to ambient gases and residual moisture. In some cases, the ambient gases and residual moisture originate from starting materials or are introduced during the fabrication of the battery. Since one of the applications of these types of batteries is in thin and flexible applications, it may also be of interest to minimize the packaging thickness. In thin batteries, such as those that are less than 1 mm in thickness, packaging makes a substantial contribution to the overall thickness. In these cases, for cost reduction and process temperature minimization, it may be advantageous to use barrier films that are thinner and that are lower barriers (e.g., that have higher permeability) than those used previously, as well as pressure-sensitive or low-temperature curable adhesives that pose a lower barrier than those used previously.

In cases where electrochemical cells generate hydrogen during operation or storage, such as from moisture dissociation or electrolyte breakdown due to side reactions, it may also be advantageous for hydrogen to be able to pass out of the cell. Otherwise, hydrogen gas may build up, leading to unwanted cell delamination, bubble formation, internal pressurization or package rupture. In cases where thinner, lower-barrier battery packaging allows the flow of some moisture into the cell, this may lead to ongoing generation of hydrogen during cell use, charging or storage. It may be advantageous for hydrogen (e.g., $H_2$ gas) to pass out of the cell. In other cases, moisture or other volatile solvents or compounds may enhance cell performance (e.g., by increasing ionic conductivity). It may be desirable to seal these materials into the cell, while allowing hydrogen to escape at a rate that prevents detrimental gas buildup. At the same time, it may also be advantageous to limit the flow of $O_2$ and $CO_2$ into the cell to limit unwanted $O_2$ or carbonate reactions, which may reduce usable cell potential and capacity.

A balance of oxygen barrier and hydrogen barrier properties may be achieved in polymer films. For example, glassy or relatively crystalline polymers may have a relatively low permeability of $O_2$, while having a relatively high $H_2$ permeation rate as compared to rubbery polymer films. Examples of glassy polymers include Kapton™ polyimide (K. Horie and T. Yamashita, *Photosensitive Polyimides: Fundamentals and Applications*, CRC Press [1995], pg. 57) and polyvinyl chloride.

Polyimide thin film packaging of printed zinc ion batteries using acrylic adhesive backed polyimide films to seal batteries deposited on metal and plastic metal laminates has been shown to dramatically improve the magnitude and stability of open-circuit voltage and capacity. In this case, the zinc ion batteries utilize a layered structure including a metal oxide cathode (e.g., $MnO_2$), printed polymer gel electrolytes comprising a high molarity metal salt or ionic liquid composition, a printed Zn anode, and, in some cases, printed carbon interfacial layers between the electrodes and metallic current collectors or contacts. In some cases, the electrode and current collector layers include mobile electrolytic species (see, e.g., U.S. Pat. No. 9,276,292).

In all cases, mobile ionic species from the electrolyte may readily diffuse into the electrode, interfacial and current collector layers. It was observed that, without any packaging, fabricated cell open circuit voltages may tend towards 1V, dropping over time to less than 1V. The immediate sealing of an as-made cell, even with relatively low-barrier films such as 12.5-micron polyimide film coated on one side with a polyacrylic pressure-sensitive adhesive, resulted in a rapid increase in open circuit voltage to greater than or equal to 1.4V, which was stable over time. The mechanism for this increase is believed to be a side Zn air reaction (oxygen-fed) between the Zn anode and the top current collector that is assisted by electrolytic species and residual or absorbed moisture in the anode/collector/air structure on top of an underlying Zn/electrolyte/metal oxide cathode cell. The polarity of the Zn air side reaction may be such to offset the potential of the underlying Zn/electrolyte/metal oxide cathode cell. The Zn air reaction may also consume part of the anode and create dielectric byproducts at the anode that may be detrimental to the underlying cell performance. By restricting the flow of oxygen through the use of the polyimide barrier film, the overlying Zn air reaction is suppressed, and the cell is able to maximize its effective total potential from the Zn/electrolyte/metal oxide cathode reactions.

Polyimide is a relatively poor barrier for moisture and has a relatively high permeability for hydrogen. For example, DuPont Kapton™ HN polyimide films have an oxygen permeability of 3,800 cc/24 hr-MPa. FIG. 8 is a graph showing the oxygen transmission rate measurement data for a coated polyimide (XF616, commercially available from Polyonics) with an acrylic adhesive packaging film collected over 120 minutes. Symbols 801 represent a calculated oxygen transmission rate. Symbols 802 represent measured oxygen levels that were used to calculate the oxygen transmission rate. Barrier properties for a 12.5-micron thick polyimide film (Polyonics XF616) with a white topcoat and an acrylic adhesive include an oxygen transmission rate of 20 $cc/m^2$-day and a water vapor transmission rate of 3 $g/m^2$-day at room temperature (see FIG. 8). However, the gas and moisture barrier properties measured for a given film may vary, depending on the measurement technique and measurement conditions (e.g., see FIGS. 1 and 3).

It is sometimes useful to use consistent and comparable measurements to compare relative properties. FIG. 1 is a table showing the transmission rates of various gases across a Kapton™ polyimide protective film. The gases include carbon dioxide, oxygen, hydrogen, nitrogen, helium, and water vapor. The transmission rate measurements were taken at 23° C. and 50% relative humidity under ASTM D-1434-82 (1988) test conditions. Based on the gas permeability data in FIG. 1, a ratio between hydrogen permeability to oxygen permeability of around 10 times is expected near room temperature for 1 mm polyimide (e.g., Kapton™) polymer(s). This large difference in hydrogen and oxygen permeability is consistent with other glassy polymers. Polyimide (Kapton™ HN) has a glass transition temperature in the range of 360° C.-410° C. This $H_2/O_2$ permeability ratio may be used to estimate hydrogen permeability based on measured oxygen permeability data when hydrogen data is not available.

FIG. 2 is a table showing oxygen and water transmission rates (OTR and WVTR, respectively) across a 100-micron thick polyimide film from Mitsubishi Gas Chemical Co. The WVTR was measured at 40° C. and 90% relative humidity using a MOCON PERMATRAN-W testing system. The OTR was measured at 23° C. in a 100% $O_2$ atmosphere using a MOCON OX-TRAN testing system. From the OTR, we can estimate an $H_2$ permeability of about 1000 cc/m$^2$/day.

Polymer films may have relatively high permeabilities for hydrogen as compared to larger molecular gases such as dioxygen or $CO_2$. FIG. 9 is a table showing $H_2$ permeabilities (measured in Barrers) and ratios of $H_2/CO_2$ permeabilities for various polymer films. The polymers include cellulose acetate, ethyl cellulose, eval film (a copolymer of polyethylene and polyvinyl alcohol), polybenzyl methacrylate, polydimethyl siloxane, polyetherimide, polyethylene (low density film), polyimide (Matrimid), polymethyl methacrylate, polymethylpentene, polyphenyleneoxide, polystyrene (MW 280 K), polystyrene-co-butadiene, polysulfone, polyvinyl acetate, and polyvinylidene fluoride (Kynar). Imide-based materials have a notably high $H_2$ to $CO_2$ ratio. This ratio may be attributed to the relatively small molecular size of $H_2$ compared to $CO_2$.

FIG. 3 is a graph showing how the transmission rates of various gases across Mylar® film (polyethylene terephthalate [PET]) vary at different temperatures. Line 301 represents helium permeability. Line 302 represents hydrogen permeability. Line 303 represents hydrogen sulfide permeability. Line 304 represents oxygen permeability. Line 305 represents nitrogen permeability. As a further example of the $H_2/O_2$ permeability ratio, the data in FIG. 3 show that the Mylar® film has a hydrogen-to-oxygen permeability ratio of approximately 15. This ratio is similar to the $H_2/O_2$ permeability ratio of approximately 10 measured for Kapton™ HN polyimide films at a temperature of 23° C. and a relative humidity of 50% under ASTM D-1434-82 (1988) test conditions as shown in FIG. 1.

The oxygen transmission rate of 20 cc/m$^2$-day and the water vapor transmission rate of 3 g/m$^2$-day at room temperature for a polyimide-based film used in the packaging of Zn polymer batteries as described in U.S. Pat. Nos. 9,076,589 and 9,276,292 were measured using customized glassware equipped with an oxygen sensor capable of reading gaseous oxygen levels below 1 ppm. FIG. 4 is a table showing a representative oxygen transmission rate (OTR) profile over time at ambient conditions (21-24° C. and 35-50% relative humidity [RH]) by recording the cumulative oxygen concentration over time and converting it to an OTR profile based on the known diffusion area of the film and the known volume of the glassware chamber. Columns of the table include: type of barrier film (high or low), polymer used to form the barrier film, oxygen transmission rate (OTR), moisture vapor transmission rate (MVTR), cell energy capacity (e.g., compared to a benchmark), capacity influenced by environment, ability of hydrogen to escape, and cell bulging if gas is produced.

Within experimental error, the OTR value is substantially in agreement with the expected values provided by the film manufacturer. Based on the hydrogen/oxygen permeability ratio discussed previously, a hydrogen permeability rate of 200 cc/m$^2$-day is estimated for the polyimide-based film of U.S. Pat. Nos. 9,076,589 and 9,276,292. However, barrier permeability measurements may depend on measurement conditions, and are recited in this application as guideline values. The values and/or specifications listed herein are assumed to have an order-of-magnitude accuracy, and indicate a range for the permeability values and/or the corresponding barrier specifications.

A near ideal gas such as $H_2$ is expected to have a molar volume of approximately 22.4 liter/mol at room temperature. For pure $H_2$ gas, this is equivalent to approximately 11,200 cc/gram. A hydrogen permeability of 200 cc/m$^2$/day (1 atm) is approximately equivalent to 0.009 mol $H_2$/m$^2$/day (at 1 atm). An oxygen permeability of 20 cc/m$^2$/day (at 1 atm) is approximately equivalent to 0.0009 mol $O_2$/m$^2$/day (at 1 atm). This rate compares to the water vapor transmission rate (WVTR) of 0.17 mol/m$^2$/day, for a water permeability of 3 g/m$^2$/day.

Hydrogen gassing may also be an important factor in battery packaging, especially in thin battery formats, where there is a limited volume in which to accommodate excess gas formation in a sealed cell, and the concentration of other ambient gases (e.g., oxygen) needs to be limited. Hydrogen evolution on metal surfaces and, in particular, in batteries is a well-known issue. In Zn alkaline aqueous primary systems, hydrogen gassing reduction strategies include alloying the Zn anode material with metals that reduce the hydrogen evolution rates. Initially, this included additives such as Hg and Pb. Due to safety and environmental issues, these additives were phased out and replaced with Bi, In and/or Al additives. Hydrogen may form from the dissociation of water, or as a decomposition product from a side reaction of the cell. One source of hydrogen in these side reactions, which is also seen in anhydrous secondary batteries, is the decomposition of the electrolyte that may occur during storage or in processes for forming lithium ion batteries. Strategies for preventing hydrogen gassing have also been developed for secondary zinc systems (e.g., U.S. Provisional Pat. Appl. No. 62/396,049).

In some cases, water is a beneficial component of electrochemical cells, such as typical Pb acid or alkaline cells. Water may also contribute to ionic conductivity in majority non-aqueous systems. For example, the ionic transport properties of non-aqueous systems containing ionic liquids may be improved or enhanced in the presence of water. Even if water is not a large or significant component of the system, water may be present in the cell due to its presence in the starting cell materials or packaging materials. Water may also be absorbed during processing or storage. For example, polyimide films may contain 1.3% water when stored at 50% RH at 23° C., and 2.5% water when stored at 98% RH at 23° C. Polyamides may have an even higher moisture content. Water may continuously permeate through the cell packaging during storage or while in use, such that even a small solubility and permeation of water in the cell may lead to continuous generation of hydrogen. If hydrogen resulting from water decomposition is not vented, it may build up in the cell, leading to inflation or high pressures within the cell and bulging, delamination or even package rupture. Given the relatively high permeabilities of water through some packaging films on a molar basis as compared to hydrogen, the possibility for hydrogen trapping may be significant, even if measures are taken to minimize hydrogen gassing. From this perspective, it may be helpful to provide packaging films and/or edge adhesives with sufficient hydrogen permeability to prevent the accumulation of hydrogen.

It is also known that the permeability of hydrogen through some materials may be enhanced significantly if those materials catalyze the decomposition of $H_2$ into monoatomic H, or if they are in proximity to a decomposition catalyst. Decomposed $H_2$ may diffuse rapidly, even through metals, due to the very small size of monatomic hydrogen. For example, palladium is known to catalyze the splitting of hydrogen.

Therefore, it may be advantageous to use films that provide a barrier to oxygen, but allow hydrogen to pass out of the cell freely, such as polyimide or polyetherimide-based packaging films. It may be further advantageous to use foils or thin films of metals, which generally are high barriers to oxygen, $CO_2$ and other gases larger than hydrogen, with either a high permeability of hydrogen and/or with the ability to promote hydrogen dissociation.

Examples of packaging materials with favorable oxygen to hydrogen ratios include (1) polyimides coated with a composite inorganic and organic coating and (2) acrylic pressure sensitive adhesives with hydrogen and oxygen permeabilities of approximately 200 $cc/m^2/day$ and 20 $cc/m^2/day$, respectively (see, e.g., the first row in FIG. 4). These materials have been shown to dramatically improve shelf life (e.g., from open circuit voltage and capacity stability data/values). Similar effects were observed for a metallized, oriented polypropylene film with an estimated $H_2$ permeability of 100-150 $cc/m^2/day$ and an $O_2$ permeation rate of 10 $cc/m^2/day$ (see, e.g., the second row in FIG. 4). For this packaging film, the low moisture/water vapor permeation rate (MVTR) led to intentional moisture inclusion in the test cell, as the low MVTR prevents moisture from reaching the cell interior and slows cell operating kinetics. In this case, hydrogen buildup was not observed.

With higher barrier packaging films, however, hydrogen buildup, as evidenced by physical bulging and degradation of cell stability, was observed. For a packaging film with an oxygen transmission rate of 0.6 $cc/m^2/day$ and an estimated hydrogen transmission rate (HTR) of approximately 6 to 9 $cc/m^2/day$ (see, e.g., the third row in FIG. 4) using a similar adhesive, the results indicate that hydrogen gassing may be significant, even in cases where the MVTR is relatively low, but where there is still sufficient internal moisture to support cell discharge kinetics. From the results shown in FIG. 4, a general packaging film specification may be developed, in which the film may have an OTR of less than 20 $cc/m^2/day$, and more preferably less than 10 $cc/m^2/day$, and an HTR of greater than 20 $cc/m^2/day$, and more preferably greater than 200 $cc/m^2/day$.

Example polymer systems of interest for "open" packaged batteries (e.g., batteries that benefit from the passage of water from the external environment into the cell, or from the passage of hydrogen out of the cell through the packaging) include polyimide, PET and polypropylene films as described above and as exemplified in FIG. 4. Another example family of polymer films of interest is amide polymers. Polyamides, including nylons and related compounds, are notable for their high water content and high water permeability, coupled with good barrier properties for oxygen and, by extrapolation, hydrogen. FIG. 5 shows the water absorption capacities and melting points (or glass transition temperature) of various amide polymers. The water absorption capacities of polyamides may exceed the water absorption capacities of polyimides.

Figure 6:
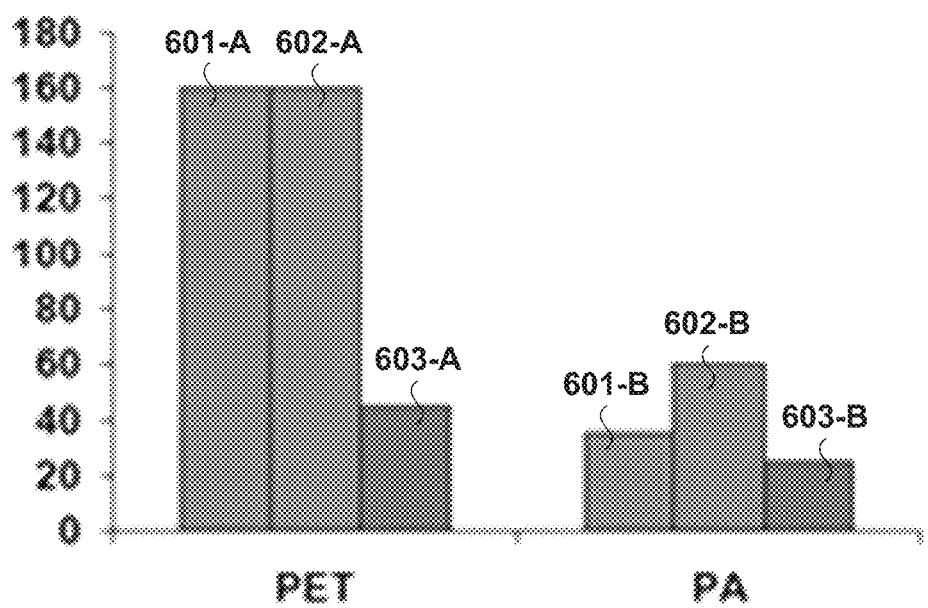
FIG. 6 is a bar graph showing the oxygen transmission rate of polyethylene terephthalate and polyamide films as cast, cast-fresh, and after biaxial orientation.

FIG. 6 is a bar graph showing the oxygen transmission rate of polyethylene terephthalate (PET) and polyamide (PA) films as cast, cast-fresh, and after biaxial orientation under 0% relative humidity. Bar 601-A represents polyethylene terephthalate as cast. Bar 602-A represents polyethylene terephthalate as cast-fresh. Bar 603-A represents polyethylene terephthalate as biaxially oriented. Bar 601-B represents polyamide as cast. Bar 602-B represents polyamide as cast-fresh. Bar 603-B represents polyamide as biaxially oriented.

Biaxially oriented films are crystalline through a stress-induced crystallization process. Polyethylene terephthalate films are amorphous when cast, while polyamide films are crystalline when cast. The OTR values for PA films are similar to those measured for polyimides. It is also assumed that hydrogen permeation rates of polyamides scale similarly to PET or PI films, especially below their glass transition temperatures, to HTRs in the range of 200 to 375 $cc/m^2/day$ (e.g., for biaxially oriented polyamides), while their high moisture absorption leads to high moisture permeability and may provide a reservoir of moisture accessible by the cell.

Figure 7:
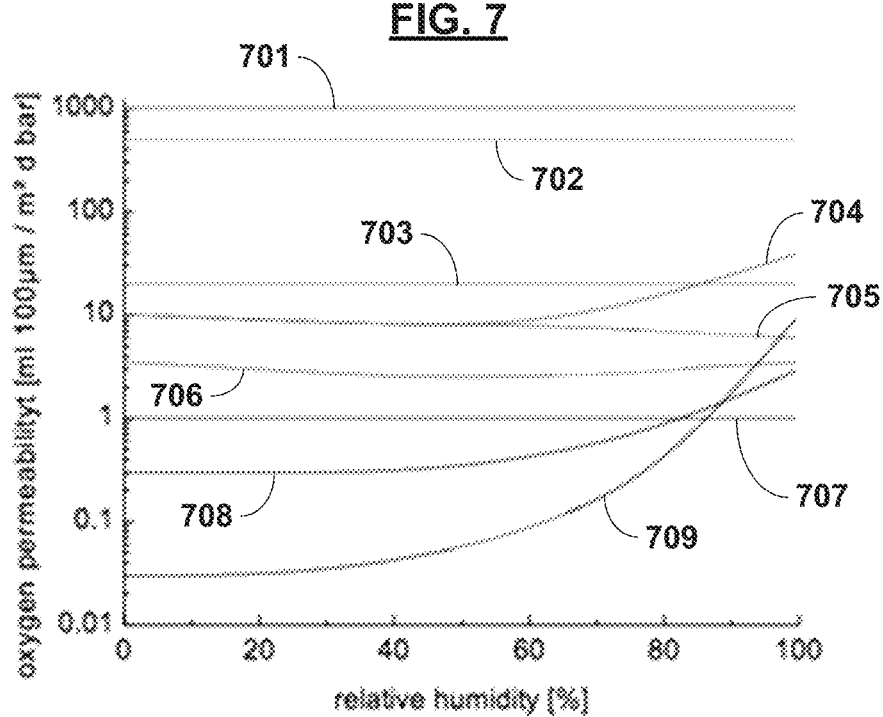
FIG. 7 is a graph showing the oxygen permeability for various high barrier polymer films at various relative humidities.

FIG. 7 is a line graph showing the oxygen transmission rates of various high-barrier polymers over a range of from 0 to 100% relative humidity. Line 701 represents polyethylene. Line 702 represents polypropylene. Line 703 represents polyethylene terephthalate. Line 704 represents polyamide (6). Line 705 represents polyamide (6I/6T). Line 706 represents polyamide (MXD6). Line 707 represents polyvinylidene chloride. Line 708 represents a copolymer of ethylene (44 mol %) and vinyl alcohol. Line 709 represents a copolymer of ethylene (32 mol %) and vinyl alcohol.

It may also be advantageous to include high surface area particles from materials such as Pt, Ta or Pd that may enhance the decomposition of hydrogen. Monoatomic hydrogen may diffuse through metal or polymer films more rapidly than molecular hydrogen. Although some hydrogen-dissociation promoting metals such as Pd may be expensive, only thin films or small mass amounts of such metals can produce a desirable effect. For example, assuming the commodity price of Pd is approximately $20 per gram, this price equates to a palladium metal cost per unit area of 2.4 cents/$cm^2$ for a 1-micron thin film, 0.24 cents/$cm^2$ for a 100 nm thin film, and 0.024 cents/$cm^2$ for a 10 nm thin film.

Based on the same $20 per gram price, nanoparticles of Pd cost 0.004 cents/$cm^2$. Other less expensive metals, such as Ta and Ti, may also catalyze and/or have a high permeability for hydrogen. Non-metals, such as Ionex Type Ag 400 Zeolite, may also catalyze $H_2$ splitting. The inclusion of those materials in, or as part of, a cell package may be advantageous for the control of hydrogen generation and/or permeation. In some cases, this inclusion may also lead to the generation or regeneration of moisture. Hydrogen that is split by metals or non-metals may also lead to the production of water from a reaction between hydrogen and oxygen (e.g., that may be catalyzed by the hydrogen-splitting species or material).

The reaction of hydrogen and oxygen to form water in batteries having an aqueous electrolyte by the use of a catalyst such as heated Pt wires or Pt sponge is known (Edison, T. A., U.S. Pat. No. 1,016,874). In thin film batteries, even those with a predominantly non-aqueous electrolyte, this formation of water may have a three-fold benefit in the case where it is desirable to maintain a high (or certain minimum) moisture content in an electrochemical cell (for example, as an ionic conductivity component of the electrolyte). Reducing the oxygen concentrations and preventing the buildup of hydrogen are also beneficial. When desirable moisture in the cell is catalytically decomposed into hydrogen and oxygen, the hydrogen splitting and water production catalyst reacts this potentially detrimental hydrogen with oxygen (which is also potentially detrimental) and converts it back to moisture.

As discussed above with regard to the FIG. 4 data and with the OTR-scaled approximations for HTR, approximate specifications may be developed for the hydrogen-to-water reaction rate that removes hydrogen and produces water. For example, this reaction rate may be comparable to the rate at which hydrogen passes through hydrogen-permeable packaging films that show acceptable thin battery performance (e.g., a hydrogen trapping [and $H_2O$ generation rate] of approximately 100 to 150 cc $H_2/m^2$/day of battery electrode area, and preferably, greater than 200 to 300 cc $H_2/m^2$/day). This approach may be used to enable use of a packaging film having a relatively high or low WVTR that, on its own, may prevent water from entering the cell and trap generated hydrogen within the cell. It is therefore advantageous to regenerate moisture and prevent hydrogen pressurization in the cell.

Oxidation of hydrogen within the cell may also be used with more permeable packaging films. For some of the polymers discussed here, such as polyimides and PET, the oxygen transmission rate is typically smaller than the hydrogen transmission rate. There may be, however, a significant amount of oxygen in the cell due to the high concentration of oxygen in the ambient environment (e.g., 20.8%), as the diffusion of oxygen is increased by high concentration gradients across the barrier packaging into the cell. This oxygen may harm the cell through oxidation of electrode materials or conductors. The cell may benefit from removal of this oxygen by sequestering it with hydrogen and/or moisture. In turn, this sequestration may have a positive impact on cell performance.

The barrier packaging film specifications in FIG. 4 (an OTR of less than 20 cc/$m^2$/day, or more preferably, less than 10 cc/$m^2$/day, and an HTR of greater than 20 cc/$m^2$/day, or more preferably, greater than 200 cc/$m^2$/day) is based on cells without $H_2$ oxidation catalyst additives. Based on the assumption that all hydrogen in the cell results from the splitting of ingressed water, the addition of an $H_2$ oxidation catalyst such that an $H_2$ oxidation rate of at least $9*10^{-4}$ moles $H_2$ per $m^2$ of cell packaging area/day ($4.5*10^{-4}$ moles $O_2$ per $m^2$ of cell packaging area/day), and more preferably at least $9*10^{-3}$ moles $H_2$ per $m^2$ of cell packaging area/day ($4.5*10^{-3}$ moles $O_2$ per $m^2$ of cell packaging area/day) may allow for the use of packaging films having substantially higher water and oxygen barrier properties than those used conventionally. Assuming that other sources of hydrogen, such as from electrolyte decomposition, are active within the cell, the use of a water-forming catalyst component may be advantageous, even if water is not present in the packaged cell and does not pass through the packaging.

Beneficial catalyst metals may be included in the cell electrodes or collectors as particle additions, where they can also contribute useful conductivity to those device components. Alternatively, they may be included as printed or laminated layers adjacent to the cell or as part of the cell packaging (e.g., as part of the packaging film). Non-conducting catalysts, such as zeolite or oxide catalysts, may be incorporated into the electrode or in the electrolyte to promote moisture replenishment in the electrolyte, and may be helpful when it is advantageous to have higher moisture levels in the electrolyte than in the anode (e.g., where high moisture levels might promote unwanted oxide or hydroxide formation). It may also be possible to introduce the non-conducting catalyst materials in a layered fashion as part of or adjacent to the electrolyte, such that the catalyst containing material is situated close to one electrode where it may be harmless or beneficial (e.g., adjacent to the cathode), and relatively far from the other electrode (e.g., the anode), where it may be harmful.

Catalysts that promote splitting of $H_2$ to increase the permeation of hydrogen out of the battery cell or to encourage the conversion of $H_2$ and $O_2$ in the cell into water may also be incorporated in the conductive additives in the electrodes and current collectors. It is possible to produce metal nanoscale deposits on carbon, in carbon black, or in or on graphite and/or graphene, which may be used as a conductive additive for one or more electrodes and/or collectors.

It has also been shown that the hydrogen oxidation rate of Pd catalysts is enhanced in acidic environments, making Pd particularly attractive for inclusion in low pH aqueous systems or in ionic liquid electrolytes which are near neutral or slightly acidic (e.g., 1-ethyl-3-methylimidazolium [EMIM] trifluoromethane sulfonate [triflate] electrolytes).

It may also be advantageous to match barrier film properties with adhesive and edge seal barrier properties to achieve the correct balance. For example, a high barrier packaging film may be used, such as a metallized or oxide-coated plastic film, to provide a relatively high barrier to oxygen or to keep moisture in the cell. A less glassy adhesive material, such as a siloxane, may be used to promote the egress of hydrogen through its elastomeric structure (e.g., with a relatively high free volume), while still maintaining a reasonable moisture barrier.

Figure 10:
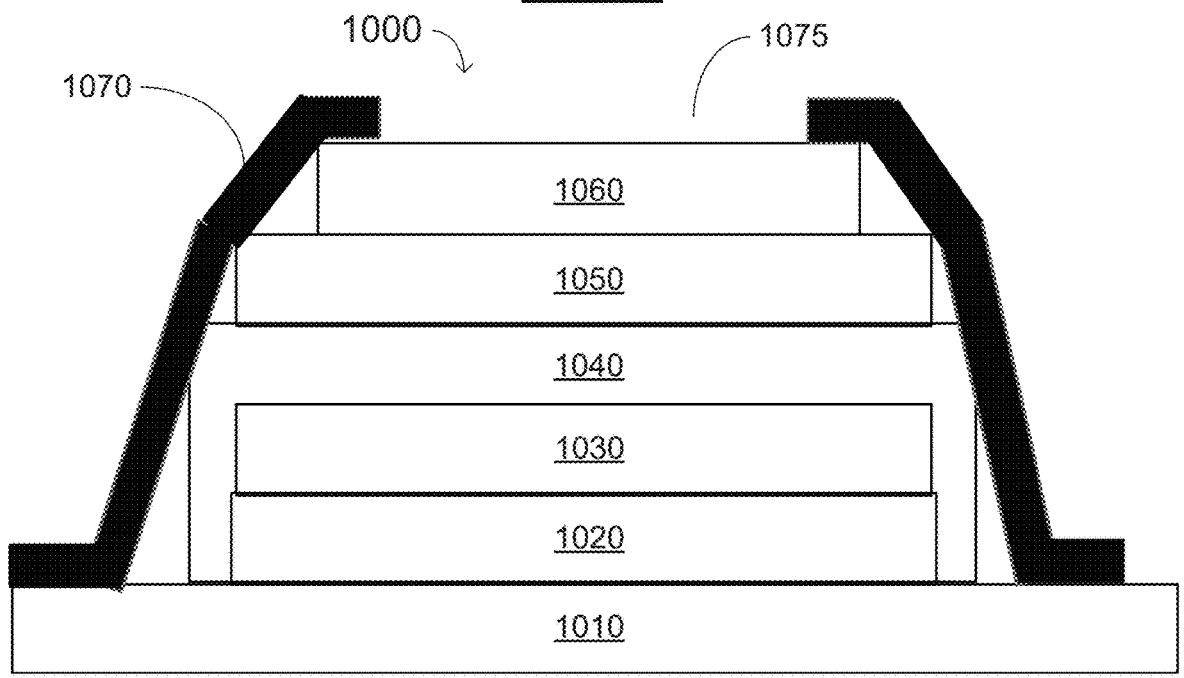
FIG. 10 is a cross-sectional diagram of an electrochemical cell with an opening in the packaging layer in accordance with one or more embodiments of the present invention.

FIG. 10 shows an electrochemical cell 1000 comprising a substrate 1010, a bottom current collector 1020, a cathode 1030, an electrolyte layer 1040, an anode 1050, a top current collector 1060, and a packaging layer 1070.

The substrate 1010 may comprise a metal foil (e.g., stainless steel, aluminum, titanium or copper foil) or a plastic sheet or film. The substrate 1010 may have a length of 7.5-450 cm, a width of 5-400 cm, and a thickness of 100-2000 μm, although the invention is not limited to values within these ranges. When the substrate 1010 is a metal foil, it may function as a contact layer for the bottom current collector 1020 (e.g., as an exposed surface for connection to an external circuit).

The bottom current collector 1020 may comprise a conductive material such as aluminum, silver, copper, graphite, etc. The bottom current collector 1020 has length and width dimensions smaller than those of the packaging layer 1070, and the length and width dimensions of the bottom current collector 1020 may define the area of the active components of the electrochemical cell 1000. The bottom current collector 1020 may have a length of 1-10 cm, a width of 0.7-8 cm, and a thickness of 10-200 μm, although the invention is not limited to values within these ranges. The bottom current collector 1020 may be formed on or above the substrate 1010 by printing and curing (e.g., heating and/or annealing) a metal-containing ink, or by blanket deposition and patterning of the conductive material.

The cathode 1030 may comprise a metal oxide (e.g., $MnO_2$, $Cr_2O_3$, or CoO). The cathode 1030 has length and width dimensions the same as or smaller than those of the bottom current collector 1020, and if smaller, generally by 2-10σ, where σ is the alignment error of the printing or patterning process used to form the cathode 1030. The cathode 1030 may also have a length of 1-10 cm, a width of 0.7-8 cm, and a thickness of 10-200 µm, although the invention is not limited to values within these ranges. The cathode 1030 may be formed on or above the bottom current collector 1020 by printing, drying and annealing a metal oxide ink, or by blanket deposition and patterning of the metal oxide.

The electrolyte layer 1040 may comprise an electrolyte salt, an ionic liquid, and an optional polymer binder. Suitable electrolyte salts, ionic liquids, polymer binders and other additives and/or agents are described in U.S. Pat. No. 9,276,292 and U.S. Provisional Pat. Appl. Nos. 62/316,115 and 62/396,049 (filed Mar. 31, 2016 and Sep. 16, 2016, respectively), the relevant portions of which are incorporated herein by reference. The electrolyte layer 1040 generally has length and width dimensions greater than or matching those of the cathode 1030 and the bottom current collector 1020, and if greater, generally by 2-10σ. The electrolyte layer 1040 may have a length of 1-11 cm, a width of 0.7-9 cm, and a thickness of 20-200 µm, although the invention is not limited to values within these ranges. The electrolyte layer 1040 may be formed on the cathode 1030 by printing the electrolyte composition, which may further include a solvent to facilitate the printing process. Any solvent present in the printed electrolyte composition can be removed by drying (e.g., heating to a temperature of 30-100° C. at a pressure of 0.1-740 Torr for a length of time sufficient to remove a desired or predetermined amount of the solvent).

The anode 1050 may comprise a metal (e.g., zinc, aluminum, magnesium, cobalt, manganese, nickel, copper, titanium, chromium, tungsten, etc.). In some cases, the metal of the anode is the elemental metal corresponding to the metal ion of the electrolyte salt. The anode 1050 generally has length and width dimensions similar to or the same as those of the cathode 1030. The anode 1050 may thus have a length of 1-10 cm, a width of 0.7-8 cm, and a thickness of 10-200 µm, although the invention is not limited to values within these ranges. The anode 1050 may be formed on or above the electrolyte layer 1040 by printing and curing (e.g., heating and/or annealing) a metal ink. Alternatively, the anode 1050 may be formed on the top current collector 1060 by blanket deposition, and the combined anode 1050-top current collector 1060 can be diced (e.g., cut into pieces having a predetermined length and width) and placed on the electrolyte layer 1040 by a low-resolution pick-and-place process.

The top current collector 1060 may comprise a metal sheet or foil (e.g., an aluminum, copper, stainless steel or titanium foil) in contact with the anode 1050. The top current collector 1060 generally has length and width dimensions the same as or smaller than those of the anode 1050. The top current collector 1060 may therefore have a length of 1-10 cm, a width of 0.7-8 cm, and a thickness of 10-200 µm, although the invention is not limited to values within these ranges. The top current collector 1060 may be formed by sputtering and patterning the metal, by printing and annealing a metal ink, by dicing and placement as described in the previous paragraph.

The packaging layer 1070 may comprise a polymer (e.g., PET, polyimide, polyamide, a PE-vinyl alcohol copolymer, or other packaging material described herein) and have an opening 1075 that exposes part of the top current collector 1060. The polymer may comprise a pressure- and/or heat-sensitive resin. The packaging layer 1070 generally has length and width dimensions greater than those of any layer of the electrochemical cell 1000, generally by at least two times the width of a sealing interface or layer (e.g., an adhesive) between the packaging layer 1070 and the substrate 1010 (e.g., 0.4-4 cm). The packaging layer 1070 may thus have a length of 1.5-15 cm, a width of 1-9.5 cm, and a thickness of 10-200 µm, although the invention is not limited to values within these ranges. The opening 1075 in the packaging layer 1070 may be rectangular or square (with or without rounded corners), circular, oval, or other polyhedral shape, and may have a length of 0.5-8 cm and a width of 0.4-6 cm, although the invention is not limited to values within these ranges. The packaging layer 1070 may be formed by roll-to-roll or roll-to-sheet processing, pick-and-place processing, lamination, printing, etc. After application of the packaging layer 1070 to the electrochemical cell 1000, heat and/or pressure may be applied (e.g., by use of a heated or unheated roller) to the packaging layer 1070.

Figure 11:
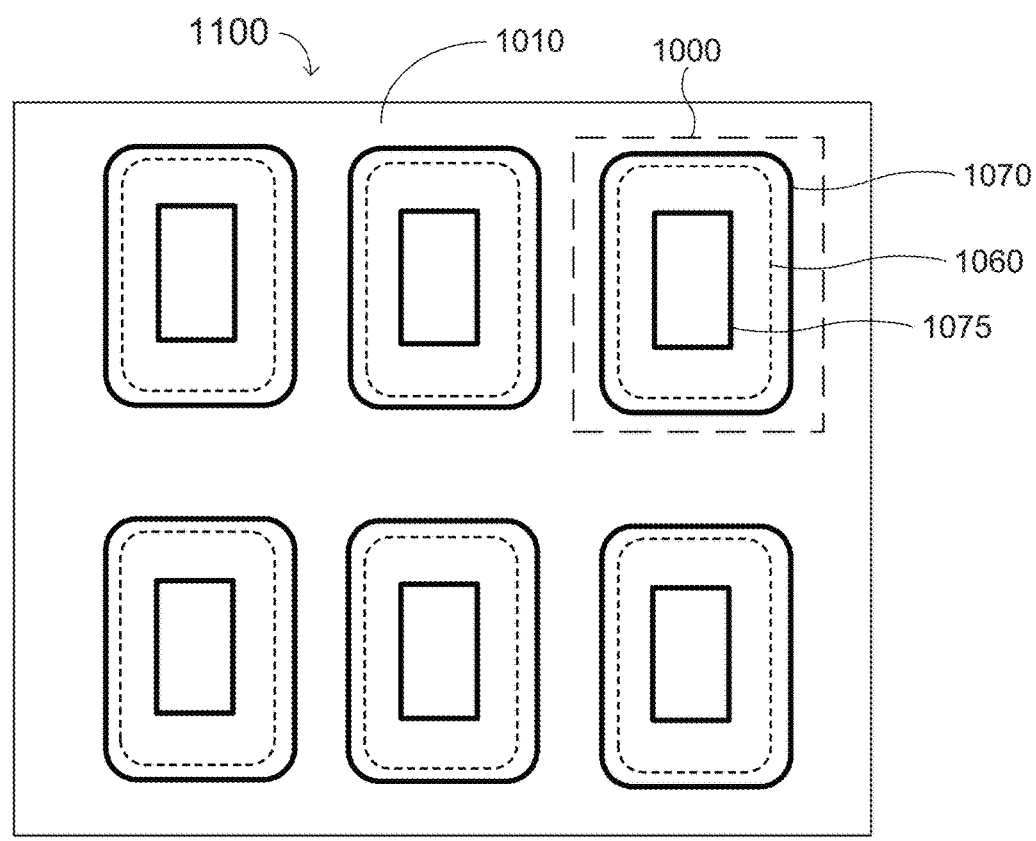
FIG. 11 is a top-down view of a sheet of electrochemical cells according to FIG. 10.

FIG. 11 shows a sheet 1100 of six identical or substantially identical electrochemical cells 1000. The electrochemical cells 1000 have a cross-section as shown in FIG. 10. The packaging layer 1070 seals the top current collector 1060 and the underlying anode, electrolyte layer, cathode and bottom current collector (not shown) on the substrate 1010. The opening 1075 in the packaging layer 1070 exposes the top current collector 1060, which functions as a contact layer for the top current collector 1060.

Figure 12:
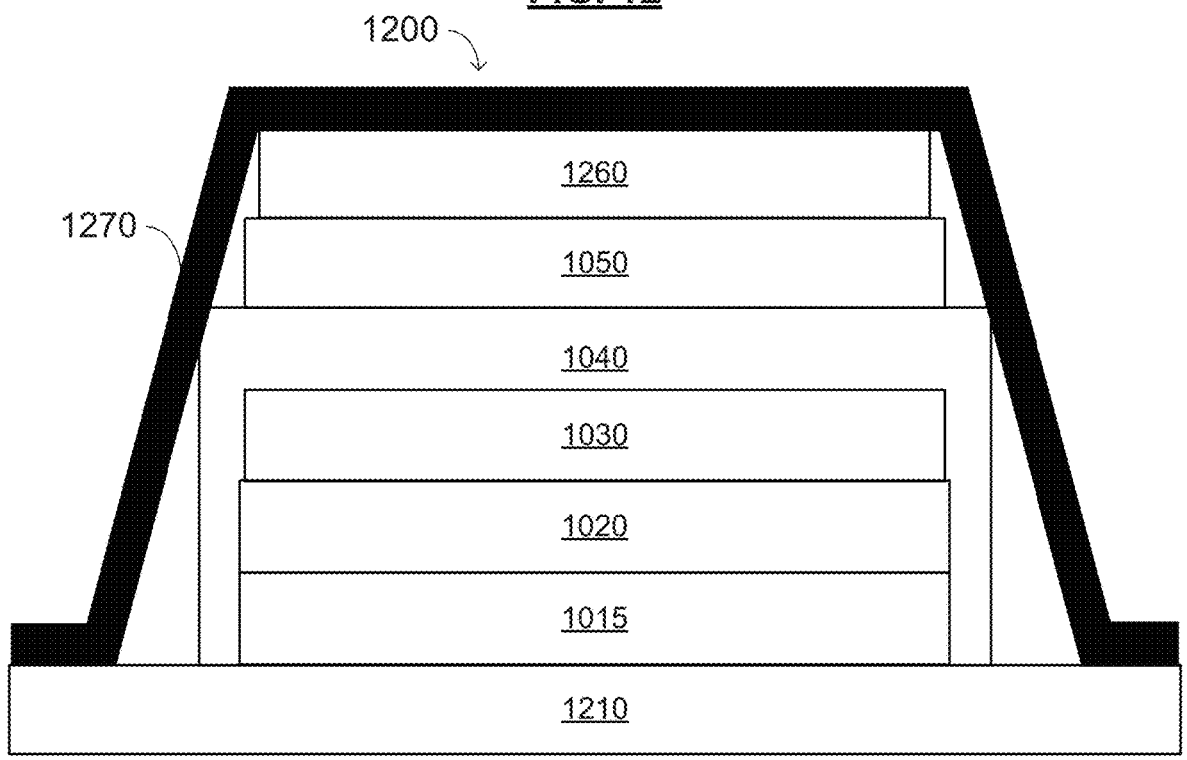
FIG. 12 is a cross-sectional diagram of an electrochemical cell with a continuous packaging layer in accordance with an embodiment of the present invention.

FIG. 12 shows an alternative electrochemical cell 1200 comprising a patterned metal foil 1015 on a mechanical substrate 1210, a bottom current collector 1020, the cathode 1030, the electrolyte 1040, the anode 1050, a top current collector 1260, and a packaging layer 1270. The mechanical substrate 1210 may comprise an electrically insulative material, such as a plastic (e.g., PET).

The packaging layer 1270 is continuous (e.g., without an opening to expose the top current collector 1260) and may comprise the same or similar polymer as for the packaging layer 1070. The top current collector 1260 may comprise the same or similar conductors as for the top current collector 1060. The bottom current collector 1020, the cathode 1030, the electrolyte layer 1040 and the anode 1050 are the same or substantially the same as the corresponding components in FIG. 10.

Figure 13:
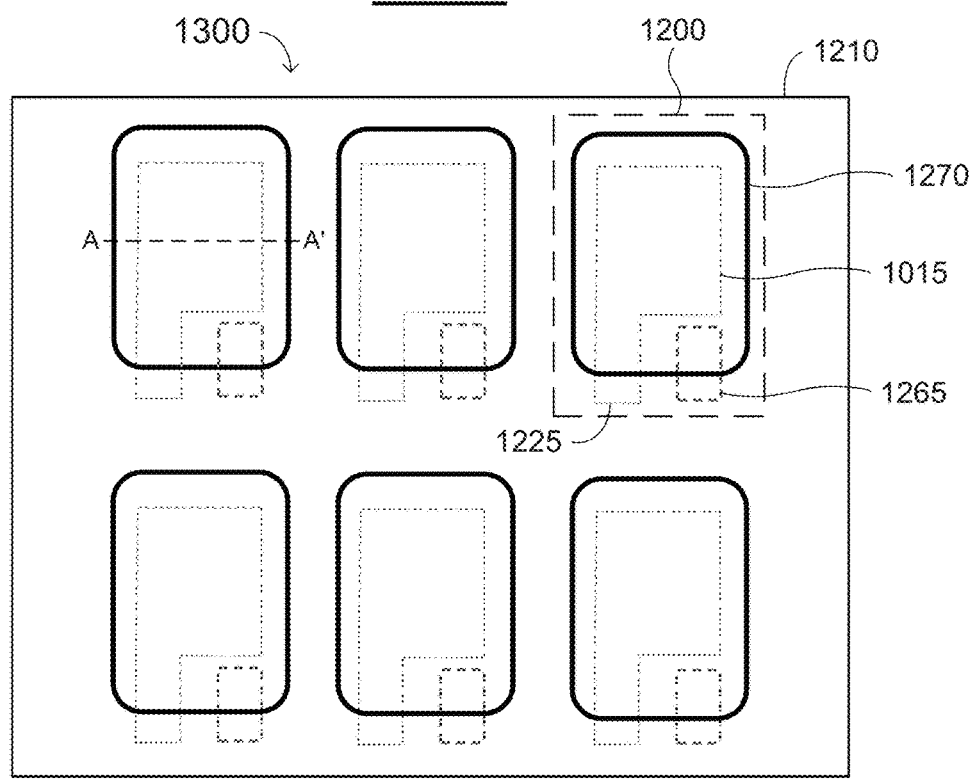
FIG. 13 is a top-down view of a sheet of electrochemical cells with separate continuous packaging layers for each cell according to FIG. 12.

FIG. 13 shows a sheet 1300 of six identical or substantially identical electrochemical cells 1200. The electrochemical cells 1200 have a cross-section as shown in FIG. 12 (e.g., along the line A-A'). The packaging layer 1270 seals part of the first tab 1225, part of the second tab 1265, the patterned metal foil 1015, the anode, the electrolyte layer, the cathode, and the top current collector (not shown) on the mechanical substrate 1210.

The patterned metal foil substrate 1015 may be formed in a pattern corresponding to the top current collector, but further including the first tab 1225. The top current collector may comprise a rectangular or square pattern of metal similar to the top current collector 1060 (FIGS. 10-11) that is electrically connected to a second tab 1265, and the top current collector and/or the second tab 1265 extends over the anode 1050, the electrolyte 1040, and the cathode 1030 (FIG. 12). An electrically insulating layer (not shown) may be between (i) the top current collector and/or the second tab 1265 and (ii) the anode, the electrolyte, and the cathode to isolate the top current collector and the second tab 1265 from the electrolyte and the cathode. Each of the first and second tabs 1225 and 1265 may have the same or similar area dimensions (e.g., a length of 0.3-2 cm and a width of 0.2-1 cm), and at least 0.1-0.2 cm of each tab 1225 and 1265 may extend beyond the edge of the packaging layer 1270. The packaging layer 1270 (which may have similar dimensions as the packaging layer 1070 in FIGS. 10-11) exposes the first and second tabs 1225 and 1265 for connecting the electrochemical cell 1200 to an external circuit.

Figure 14:
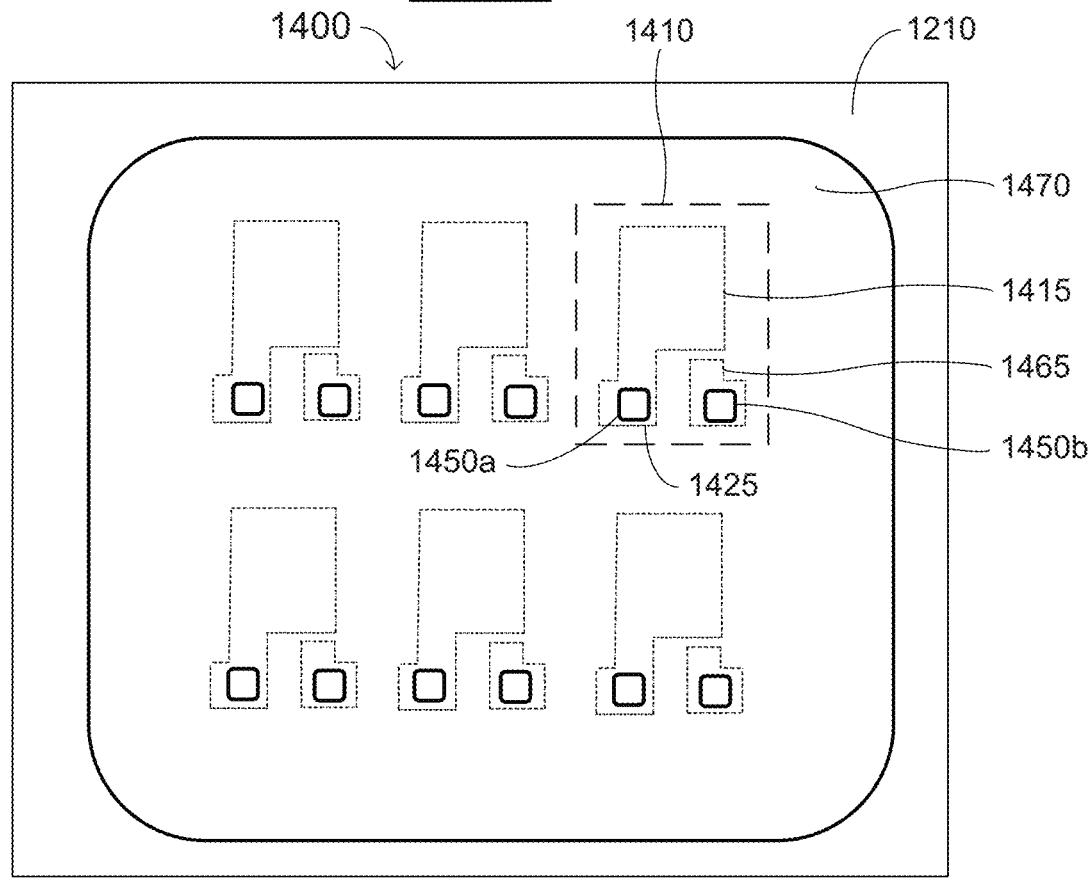
FIG. 14 is a top-down view of a sheet of electrochemical cells with one packaging layer for all of the cells on the sheet and two openings for each cell on the sheet in accordance with an embodiment of the present invention.

FIG. 14 shows a sheet 1400 of six identical or substantially identical electrochemical cells 1410. The electrochemical cells 1410 have a cross-section as shown in FIG. 12 (e.g., along the line A-A'). The packaging layer 1470 seals the first tab 1425, the second tab 1465, the patterned metal foil 1415, the anode, the electrolyte layer, the cathode, and the top current collector (not shown) on the substrate 1210. The first tab 1425 is continuous with the patterned metal foil 1415, the patterned metal foil 1415 is in continuous or substantially continuous contact with the bottom current collector, and the second tab 1465 is connected to the top current collector (not shown) similarly or identically to the second tab 1265 in FIGS. 12-13. Openings 1450a and 1450b in the packaging layer 1470 (FIG. 14) expose the first tab 1425 and the second tab 1465, respectively. The tabs 1425 and 1465 may be square, L-shaped, circular or rectangular, as described herein. The design of the packaging layer 1470 in FIG. 14 (i.e., having openings 1450a and 1450b that are smaller than and that expose only the first and second tabs 1425 and 1465) may provide an optimal seal to keep components such as the ionic liquid and any solvent and/or water that may be present from leaking or otherwise escaping the electrochemical cells 1410.

Figure 15:
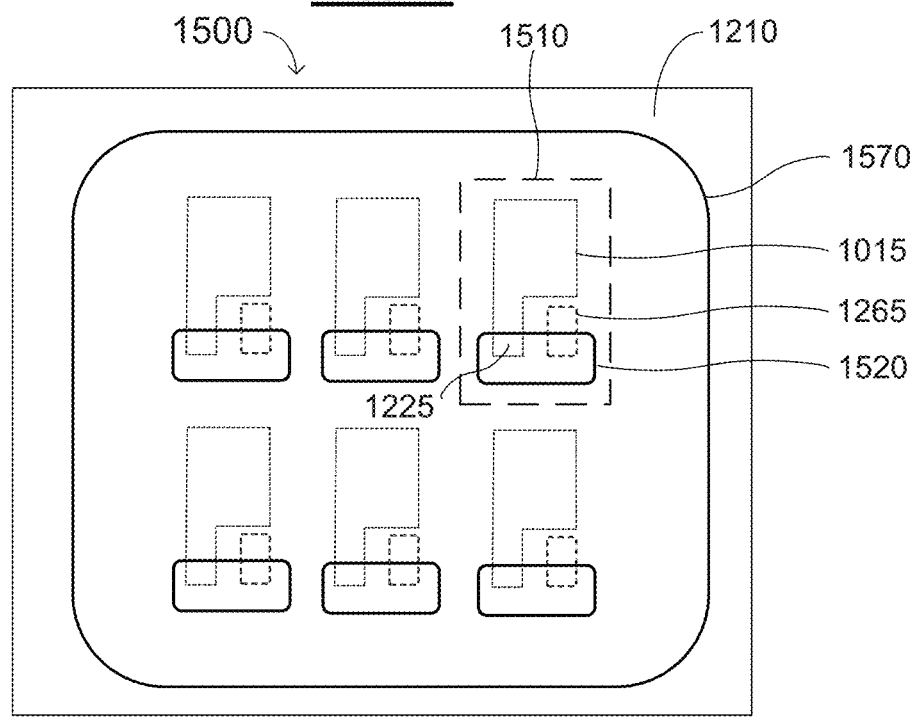
FIG. 15 is a top-down view of a sheet of electrochemical cells with one packaging layer for all of the cells on the sheet and one opening for each cell on the sheet in accordance with an embodiment of the present invention.

FIG. 15 shows a sheet 1500 of six identical or substantially identical electrochemical cells 1510. The electrochemical cells 1510 are substantially similar to electrochemical cell 1200 and have a cross-section as shown in FIG. 12 (e.g., along the line A-A'). The tabs 1225 and 1265 in the electrochemical cells 1510 have the same or substantially the same shapes, structures and locations as the tabs 1225 and 1265 in FIG. 13. A packaging layer 1570 seals parts of both tabs 1225 and 1265, the patterned metal foil 1015, the anode, the electrolyte layer, the cathode, and the top current collector (not shown) on the substrate 1210. The tab 1225 is continuous with the patterned metal foil 1015, and the patterned metal foil 1015 is in continuous or substantially continuous contact with the bottom current collector. The tab 1265 is connected to the top current collector 1260 as described herein. A single opening 1520 in the packaging layer 1570 exposes both tabs 1225 and 1265. Using one large opening facilitates alignment of the opening 1520 with the tabs 1225 and 1265 relative to the design 1400 of FIG. 14.

Figure 16A:
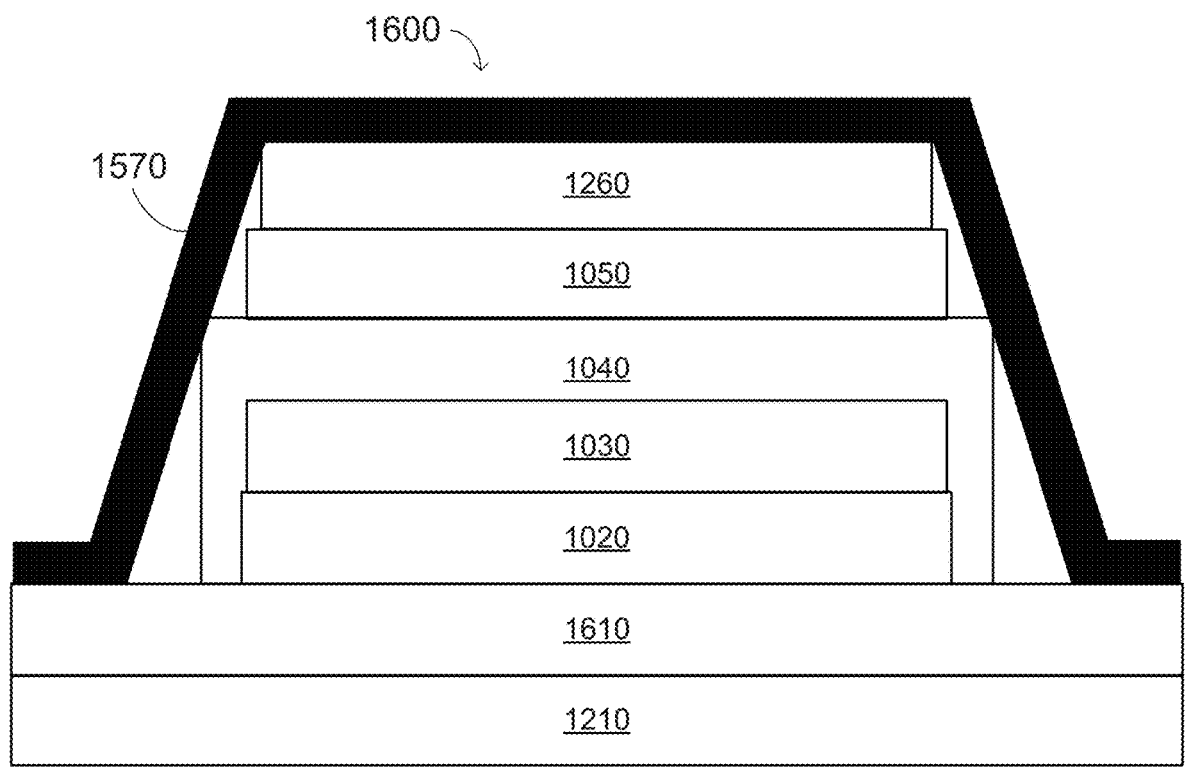
FIGS. 16A-B are cross-sectional and top-down views, respectively, of an alternative sheet of electrochemical cells with one packaging layer for all of the cells on the sheet and one opening for each cell on the sheet in accordance with embodiments of the present invention.

FIG. 16A shows an alternative electrochemical cell 1600 comprising a metal foil 1610 on a mechanical substrate 1210, a bottom current collector 1020, a cathode 1030, an electrolyte 1040, an anode 1050, a top current collector 1260, and a packaging layer 1570. The mechanical substrate 1210 and the top current collector 1260 may be the same or substantially the same as the mechanical substrate 1210 and the top current collector 1260 in FIG. 12. The bottom current collector 1020, the cathode 1030, the electrolyte 1040 and the anode 1050 may be the same or substantially the same as the corresponding components in FIG. 10. The packaging layer 1570 may be the same or substantially the same as the packaging layer 1570 in FIG. 15. The metal foil 1610 may comprise the same material as the metal foil 1010, but the metal foil 1610 is modified slightly as shown in FIG. 16B.

Figure 16B:
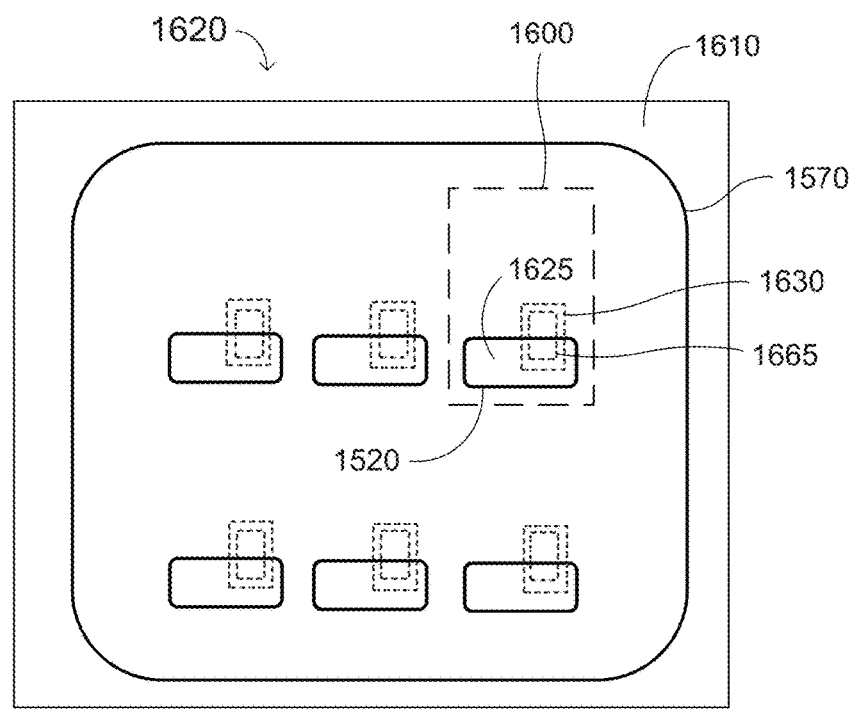

FIG. 16B shows a sheet 1620 of six identical or substantially identical electrochemical cells 1600. The electrochemical cells 1600 have a cross-section as shown in FIG. 16A. Similar to the design of FIG. 15, the opening 1520 in the packaging layer 1570 exposes both a first tab area 1625 and a second tab 1665. The first tab area 1625 is part of the continuous metal foil 1610. The second tab 1665 is connected to the top current collector (not shown). An insulating layer may isolate the top current collector and/or the second tab 1665 from the anode, the electrolyte and the cathode, and a portion 1630 of the metal foil 1610 between the first and second tabs 1625 and 1665 is removed (e.g., by stripping or etching) to isolate the second tab 1665 from the first tab 1625. The packaging layer 1570 seals the anode, the electrolyte layer, the cathode, and the bottom and top current collectors on the metal foil 1610.

The advantages of the electrochemical cell 1600 include (1) a lower tooling cost, (2) better alignment tolerances (e.g., between the opening 1520 and the tabs 1625 and 1665), and (3) a reduction or prevention of leaks of the electrolyte (e.g., the ionic liquid). The shape of the substrate 1610 and the packaging layer 1570 may be adjusted according to the manufacturer's method or equipment.

In a substrate-as-sheet design, the isolated anode "tab" (e.g., substrate 1010 in FIGS. 10-11) faces down (e.g., is on an opposite side of the cell from the cathode collector contact or "tab"). In a sheet-as-packaging-film design, one wide opening (e.g., the opening 1520 in FIGS. 15 and 16B) for both tabs on the packaging sheet reduces an alignment issue where the opening has to be aligned over the current collector tabs. An adhesive to secure the packaging layer over a cell may comprise a pressure sensitive adhesive (PSA) or a heat sealable adhesive under the packaging layer. For example, a PSA may be printed on the desired location on the cell and/or substrate. The PSA may be cured (e.g., using a thermal or ultraviolet [UV] process). Alternatively, the heat sealable adhesive may be printed in the desired location, followed by drying and/or sealing with heat. The lamination direction of the packaging layer may be bi-directional (e.g., after the packaging layer is aligned, a pressure roller may roll in the vertical [i.e., top-to-bottom] direction and/or the horizontal [i.e., left-to-right] direction). The vertical lamination direction is preferred, since it forms a better seal around current collector tabs.

Figure 17:
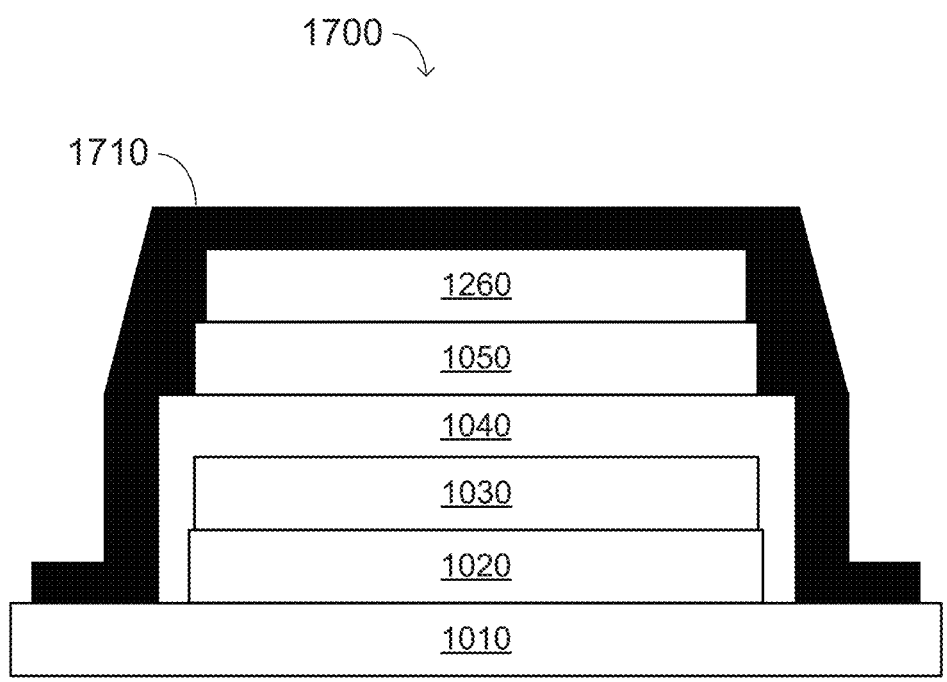
FIG. 17 is a cross-sectional view of an alternative electrochemical cell with a continuous packaging layer and no air pockets in accordance with an embodiment of the present invention.

FIG. 17 shows an electrochemical cell 1700 comprising the substrate 1010, the bottom current collector 1020, the cathode 1030, the electrolyte layer 1040, the anode 1050, the top current collector 1260, and a packaging layer 1710. The electrochemical cell 1700 is substantially similar to the electrochemical cell 1200 (FIG. 12). However, the packaging layer 1710 is formed without an air pocket between the packaging layer 1710 and the stack comprising the substrate 1010, the bottom current collector 1020, the cathode 1030, the electrolyte layer 1040, the anode 1050, and the top current collector 1260. The substrate 1010 may include a metal foil as described herein (which may be patterned or unpatterned), and optionally, a mechanical, electrically insulative substrate (e.g., as described with regard to FIGS. 12-16A).

If a PSA is applied to the packaging layer 1710 through a process that does not include printing, an air pocket may be formed between the packaging layer and an electrochemical cell. If the adhesive (e.g., a PSA) is applied by printing, no air pocket is formed (e.g., as shown in FIG. 17), with or without a laminated packaging film. If a heat-sealed adhesive (HSA) is printed only around the edge of an electrochemical cell, an air pocket may be formed. If the HSA is printed across the whole cell, no air pocket is formed, with or without a laminated packaging film. The electrochemical cell 1700 and the packaging layer 1710 may comprise either (1) a printed adhesive and printed coating-as-barrier, or (2) a printed adhesive and laminated film-as-barrier. The adhesive cure mechanism may be UV, thermal or simply drying for all printed packaging layers. However, in FIG. 16, the preferred method to apply the packaging film 1570 comprises screen-printing a solution of HSA around the cells 1610, followed by drying, applying the packaging film 1570 with the help of an alignment guide, and applying pressure using a heated roller to seal the cells 1610.

When a sheet of electrochemical cells includes a separate packaging film for each cell (e.g., FIGS. 10 and 13), the packaging films with an adhesive underneath may be applied with the help of an alignment template, followed by rolling to press the packaging films on top of the cells, and removing a release liner (if present). The packaging films may be sandwiched between the release liner and a carrier film. Once the packaging films are laminated, the carrier film is then removed.

When a sheet of electrochemical cells includes one sheet-wide packaging film for all the cells (e.g., FIGS. 14 to 16B), an alignment template may be used to apply the packaging film with an adhesive underneath. The carrier film is optional, although it is preferred for improved dimensional stability and wrinkle prevention.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An electrochemical cell, comprising:
    a cathode;
    an anode;
    an electrolyte, in contact with the cathode and the anode;
    a first current collector, in contact with the cathode;
    a second current collector, in contact with the anode;
    a protective film, finitely permeable to $H_2$ gas and $O_2$ gas, disposed directly on or around the cathode, the anode, the electrolyte, the first current collector, and the second current collector, configured to allow an $H_2$ gas in the electrochemical cell to exit from the electrochemical cell, and having a permeation ratio of the $H_2$ gas to an $O_2$ gas greater than or equal to 10:1; and
    a substrate, comprising an electrical insulator and a metal foil thereon, wherein the metal foil is in contact with one of the first current collector or the second current collector, and wherein the cathode, the anode, the electrolyte, and the first current collector and the second current collectors are positioned and sealed between the protective film and the substrate.

2. The electrochemical cell of claim 1, wherein the electrochemical cell is a multivalent ion electrochemical cell.

3. The electrochemical cell of claim 1, wherein the electrochemical cell has an $O_2$ gas transmission rate near or at operating or storage conditions of the electrochemical cell of greater than 10 cc/m²/day.

4. The electrochemical cell of claim 1, further comprising water, disposed in at least the electrolyte.

5. The electrochemical cell of claim 1, wherein the electrolyte comprises an ionic liquid, a metal salt, and/or water.

6. The electrochemical cell of claim 1, wherein the protective film comprises a zeolite additive.

7. The electrochemical cell of claim 1, wherein the protective film conforms around a stack formed by the cathode, the anode, the electrolyte, the first current collector, and the second current collector.

8. The electrochemical cell of claim 1, wherein the protective film conforms around a first tab and a second tab and seals the first tab and the second tab together with the substrate, wherein the first tab is in contact with the first current collector, and wherein the second tab is in contact with the second current collector.

9. The electrochemical cell of claim 8, wherein one of the first tab or the second tab is part of the metal foil of the substrate.

10. The electrochemical cell of claim 1, wherein the protective film comprises a pressure-sensitive adhesive, contacting at least one of the cathode, the anode, the electrolyte, the first current collector, or the second current collector.

11. The electrochemical cell of claim 1, wherein the protective film comprises a metal oxide top coat, controlling, at least in part, the permeation ratio of the $H_2$ gas to the $O_2$ gas.

12. The electrochemical cell of claim 1, wherein the electrochemical cell is a printed electrochemical cell.

13. The electrochemical cell of claim 1, wherein the cathode comprises $MnO_2$.

14. The electrochemical cell of claim 1, wherein the protective film comprises an opening, exposing a portion of at least the first current collector or the second current collector.

15. The electrochemical cell of claim 1, wherein the protective film has a thickness of between 10 micrometers and 200 micrometers.

16. An electrochemical cell, comprising:
    a cathode;
    an anode;
    an electrolyte, in contact with the cathode and the anode;
    a first current collector, in contact with the cathode;
    a second current collector, in contact with the anode;
    a protective film, finitely permeable to $H_2$ gas and $O_2$ gas, disposed directly on or around the cathode, the anode, the electrolyte, the first current collector, and the second current collector, comprising a first additive that promotes (i) forming monatomic or mobile hydrogen species or (ii) sequestering or gettering hydrogen or oxygen; and
    a substrate, comprising an electrical insulator and a metal foil thereon, wherein the metal foil is in contact with one of the first current collector or the second current collector, and wherein the cathode, the anode, the electrolyte, and the first current collector and the second current collectors are positioned and sealed between the protective film and the substrate.

17. The electrochemical cell of claim 16, wherein the first additive comprises an oxidizable metal film, oxidizable metal particles, or a film or particles of a metal or metal oxide in which hydrogen is soluble.

18. The electrochemical cell of claim 16, wherein the protective film has an oxygen permeation rate of less than 10 cc/m²/day.

19. The electrochemical cell of claim 16, wherein the anode comprises a second additive that promotes (i) forming monatomic or mobile hydrogen species or (ii) sequestering or gettering hydrogen or oxygen.

20. An electrochemical cell, comprising:
a cathode;
an anode;
an electrolyte, in contact with the cathode;
a first current collector, in contact with the anode;
a second current collector, in contact with the anode;
a protective film, finitely permeable to $H_2$ gas and $O_2$ gas, disposed directly on or around the cathode, the anode, the electrolyte, the first current collector, and the second current collector, comprising a first additive that promotes oxidation of hydrogen to $H_2O$ or reduction of oxygen to $H_2O$; and
a substrate, comprising an electrical insulator and a metal foil thereon, wherein the metal foil is in contact with one of the first current collector or the second current collector, and wherein the cathode, the anode, the electrolyte, and the first current collector and the second current collectors are positioned and sealed between the protective film and the substrate.

* * * * *